United States Patent
Takahashi

(10) Patent No.: US 7,502,379 B2
(45) Date of Patent: Mar. 10, 2009

(54) DISK PLAYBACK APPARATUS

(75) Inventor: Akihito Takahashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 732 days.

(21) Appl. No.: 10/843,628

(22) Filed: May 12, 2004

(65) Prior Publication Data

US 2004/0252984 A1 Dec. 16, 2004

(30) Foreign Application Priority Data

Jun. 10, 2003 (JP) ............................. 2003-165341

(51) Int. Cl.
H04L 12/56 (2006.01)
H04J 1/16 (2006.01)

(52) U.S. Cl. ...................... 370/419; 370/412

(58) Field of Classification Search ................ 370/252, 370/535, 485–490, 412, 386; 725/88, 141; 386/45, 49, 69, 70, 125; 348/7; 375/240.01
See application file for complete search history.

(56) References Cited

U.S. PATENT DOCUMENTS

| 5,758,007 | A | * | 5/1998 | Kitamura et al. ............. 386/45 |
| 5,900,904 | A | * | 5/1999 | Okada et al. ................. 725/92 |
| 5,999,694 | A | | 12/1999 | Yasuda et al. |
| 2001/0010671 | A1 | | 8/2001 | Ando et al. |
| 2003/0142956 | A1 | * | 7/2003 | Tomita et al. ................. 386/69 |

FOREIGN PATENT DOCUMENTS

| CN | 1394438 | 1/2003 |
| EP | 0 926 670 A3 | 6/1999 |
| JP | 6 111 545 A | 4/1994 |
| JP | 07-284061 A | 10/1995 |
| JP | 08-167226 | 6/1996 |
| JP | 09-018870 A | 1/1997 |
| JP | 2001-344873 A | 12/2001 |
| JP | 2003-061032 A | 2/2003 |

* cited by examiner

Primary Examiner—John Pezzlo
(74) Attorney, Agent, or Firm—Sughrue Mion, PLLC

(57) ABSTRACT

A disk playback apparatus is provided which can play back the video and audio without a sense of incongruity regardless of the contents of a video CD even after a stop. The disk playback apparatus includes a continued playback address detecting section for detecting an address at which picture data is recorded on a disk, when playback data stored in an external memory is picture data; a continued playback address memory section for storing, every time the continued playback address detecting section detects the address, the detected address in placed of an address which has been stored already; and a control microcomputer for restarting reading, with a pickup, the data recorded on the disk from the address stored in the continued playback address memory section in response to a playback instruction issued after a stop.

5 Claims, 3 Drawing Sheets

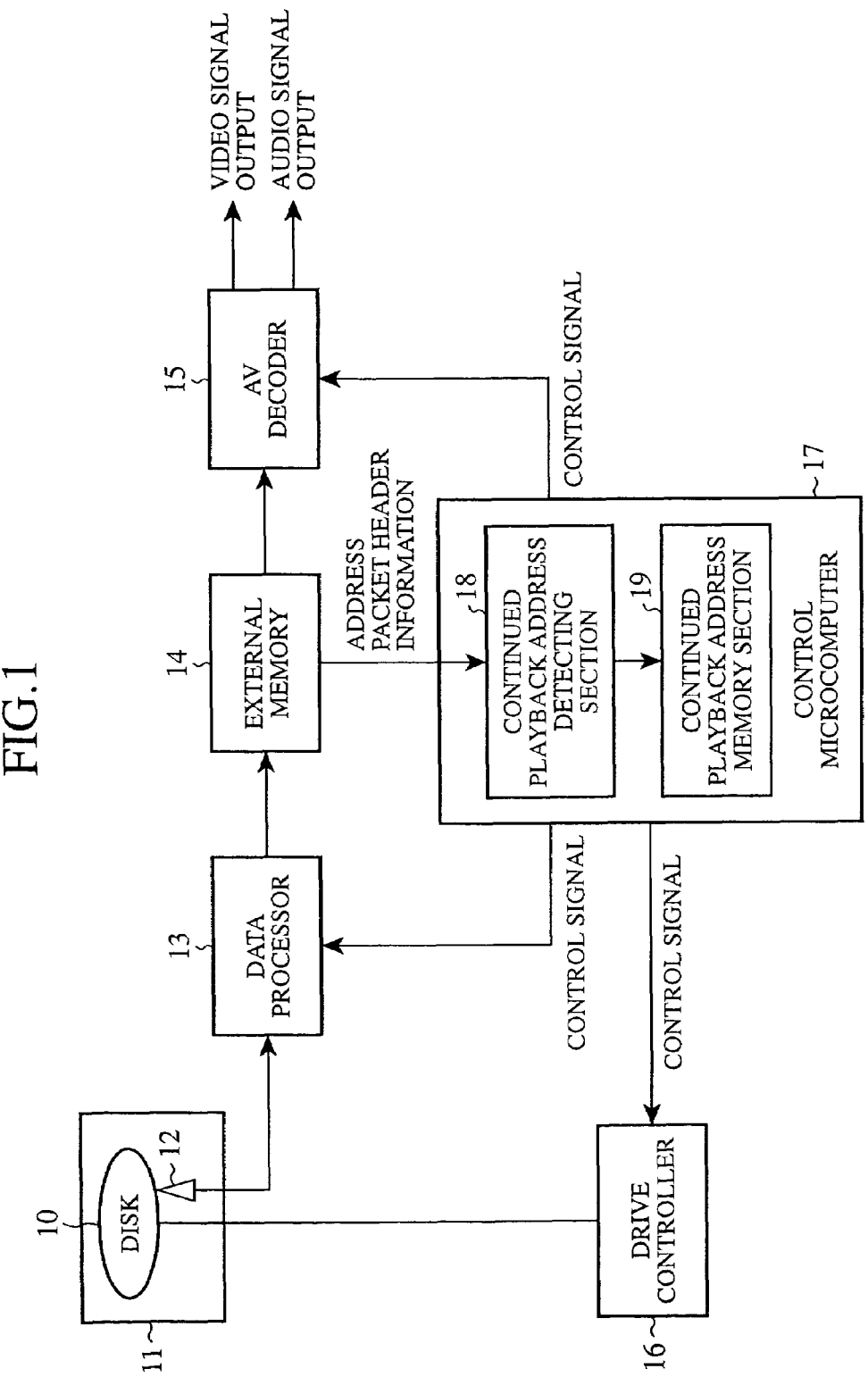

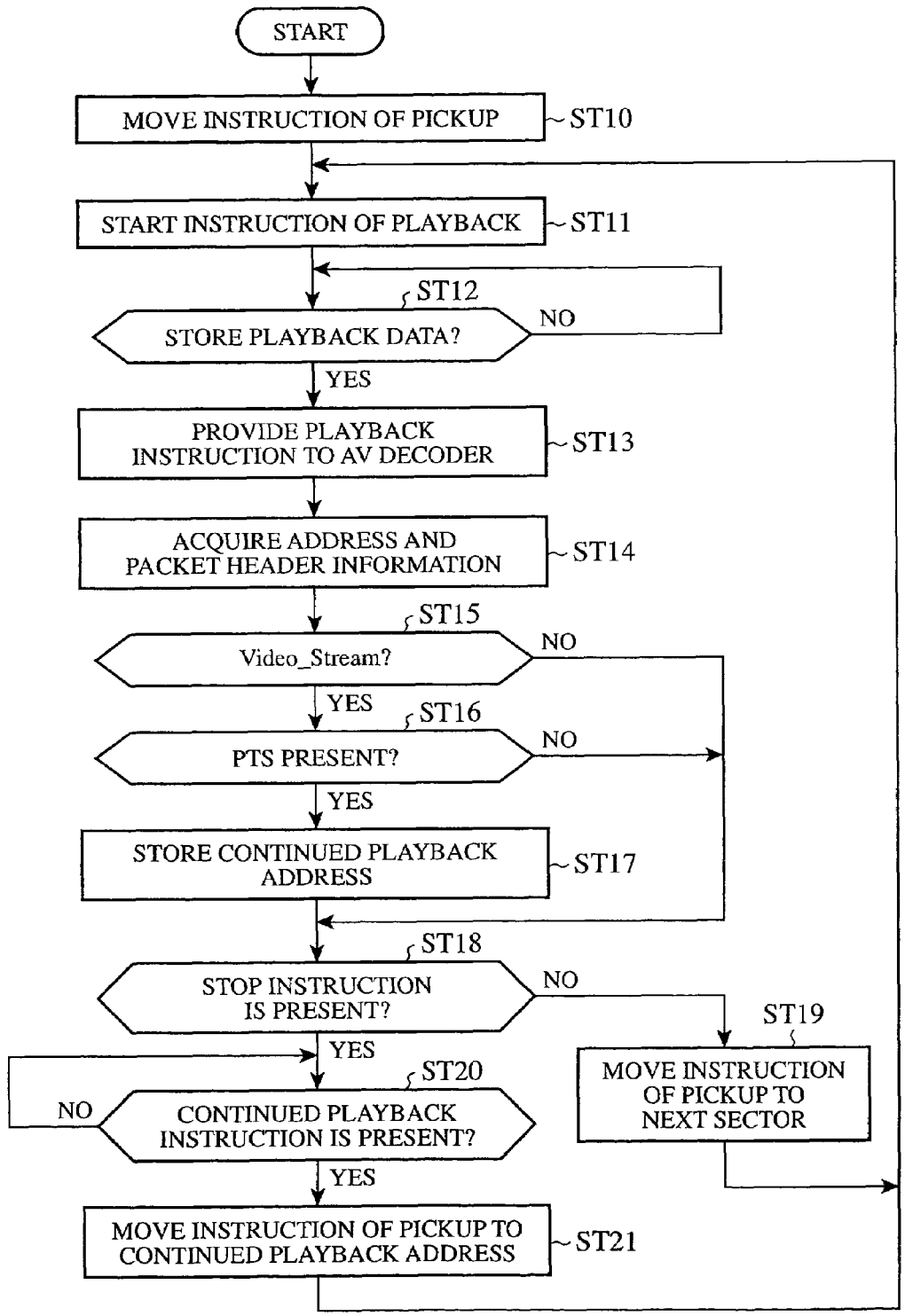

DISK PLAYBACK APPARATUS

BACKGROUND OF THE INVENTION

1. Field of the Invention

The present invention relates to a disk playback apparatus for reproducing video and audio in response to data recorded on a video CD (Compact Disk), and more particularly to a technique for synchronizing the audio to the video.

2. Description of Related Art

Conventionally, a disk playback apparatus for reproducing video and audio in response to the data recorded on a video CD has been known. The video CD played back by the disk playback apparatus stores the video and audio data by dividing them into units called packets. During playback of the video and audio in response to the data recorded on the video CD, the disk playback apparatus stores addresses (track address and sector address) recorded on the video CD containing a packet while updating the addresses.

It is very common for a user of the disk playback apparatus to stop the playback of the video and audio, followed by restarting the playback again (called "continued playback" from now on). In this case, the disk playback apparatus reads the packet from the address where the playback stops, and carries out the continued playback.

As for relevant techniques, Relevant Reference 1 discloses a timing detecting circuit and method for detecting the processing timing of frame data corresponding to playback output time management information for synchronization control between pictures and audio. The timing detecting circuit has a counter, a register and a frame counter in a video decoder. The counter counts the number of frames of encoded picture data stored in the frame memory area of a RAM. The register loads the count value from the counter in response to the timing at which a PTS (Presentation Time Stamp) is supplied from a demultiplexer to a host processor, and decrements the loaded count value every time the analyzing processing is completed which is performed frame by frame for the encoded picture data read from the storing area. The frame counter has a "0" detecting circuit output a timing detection signal when the count value of the register becomes zero. The configuration not only enables the compatibility with conventional apparatuses, but also has an advantage in cost.

As an alternative technique, Relevant Reference 2 discloses a disk playback apparatus and a disk playback method capable of facilitating the handleability of a user by automatically switching the types of a sub-video stream on a specified unit basis. To playback a disk recording a main video and multiple types of sub-videos corresponding to the main video, the technique specifies two or more types of the sub-videos, and carries out the playback by automatically switching the designated two or more types of the sub-videos sequentially at every specified playback unit.

Relevant Reference 1: Japanese patent application laid-open No. 9-18870/1997.

Relevant Reference 2: Japanese patent application laid-open No. 2001-344873.

Such video CDs are roughly divided into common CDs recording motion pictures and audio, and slide show CDs recording still pictures and audio. The common CDs contain an overwhelming amount of picture data as compared with the audio data in the playback data. Accordingly, when the continued playback is performed from the address memorized at the stop of the playback, it is very likely that the video is played back first, and then the audio, thereby providing a quite normal feeling.

In contrast with this, as for the slide show CDs, the picture data occupy an extremely small amount of data compared with the audio data in the playback data, and are sparse in the playback data. Accordingly, when the continued playback is performed from the address memorized at the stop of the playback, it is very likely that the audio is almost always played back first, and then the video. Thus, a state occurs in which although the audio is being output, the video is not yet output, presenting a problem of providing a sense of incongruity.

SUMMARY OF THE INVENTION

The present invention is implemented to solve the foregoing problem. It is therefore an object of the present invention to provide a disk playback apparatus capable of playing back the video and audio without a sense of incongruity regardless of the contents of a video CD even after a stop.

To achieve the foregoing object, according to one aspect of the present invention, there is provided a disk playback apparatus including an address detecting section for detecting, when playback data stored in a memory is picture data, an address at which the picture data is recorded on a disk; an address memory section for storing, every time the address detecting section detects the address, the detected address in placed of an address which has been stored already; and a controller for restarting reading, with a pickup, the data recorded on the disk from the address stored in the address memory section in response to a playback instruction issued after a stop.

Thus, it can always playback the video first. Accordingly, it can playback the video and audio without a sense of incongruity regardless of the contents of the video CD even after the stop.

BRIEF DESCRIPTION OF THE DRAWINGS

FIG. 1 is a block diagram showing a configuration of an embodiment 1 of the disk playback apparatus in accordance with the present invention;

FIG. 3 is a flowchart illustrating the processing carried out in the embodiment 1 of the disk playback apparatus in accordance with the present invention.

DETAILED DESCRIPTION OF THE PREFERRED EMBODIMENT

The embodiment in accordance with the present invention will now be described with reference to the accompanying drawings.

Embodiment 1

First, a video CD to be played back by the embodiment 1 of the disk playback apparatus in accordance with the present invention will be described.

The video CD stores digitally compressed encoded picture data and audio data. The digitally compressed encoding is based on the MPEG (Motion Picture Coding Experts Group) standard.

The MPEG standard carries out the data compression of the picture data by performing one of the following three predictive codings: (1) Intra pictures (I pictures) coded separately in a frame; (2) Predictive pictures (P pictures) coded with respect to immediately previous pictures; and (3) Bidirectionally Predictive pictures (B pictures) coded with respect to the immediate previous picture, as well as the immediate next picture.

In the predictively coded inter-frame prediction, a plurality of frames constitute a data unit (processing unit) called a GOP (Group Of Pictures). Each GOP includes at least one frame of the I picture.

Consider the decoding of the predictively coded pictures. As for the I pictures, since they undergo the predictive coding within each frame, they can be decoded separately by themselves. As for the P pictures, however, since they are predictively coded with respect to the previous I pictures or P pictures, the decoding also requires the previous I pictures or P pictures. Likewise, since the B pictures are predictively coded with respect to the previous or subsequent I pictures or P pictures, the decoding also requires the previous or subsequent I pictures or P pictures. Thus, to decode the pictures required for the decoding in advance, each GOP places the I pictures at its top, followed by pictures necessary for the decoding.

The MPEG standard compresses the audio data in addition to the picture data passing through the predictive coding and compression. Then, the picture data and audio data passing through the compression are recorded on the disk as time division multiplexed bit stream data.

Figure 2A:
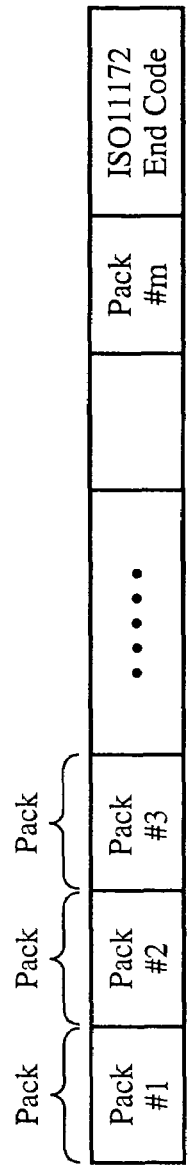
FIG. 2 is a diagram illustrating a format of playback data used in the embodiment 1 of the disk playback apparatus in accordance with the present invention.

FIG. 2 illustrates an example of a data format of the multiplexed data. As illustrated in FIG. 2(A), a unit of the multiplexed bit stream of the multiplexed data stored on the disk in a time division multiplexing mode consists of at least one pack and the ISO__11172_End_Code indicating an end. The ISO__11172_End_Code is composed of 32 bits defined by "0x000001B9" in hexadecimal notation, where "0x" at the initial position indicates that the subsequent numerals and letters are represented in hexadecimal.

Figure 2B:
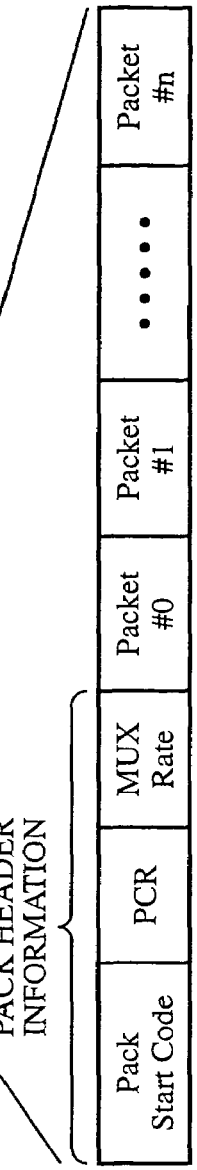

As illustrated in FIG. 2(B), each pack is composed of pack header information consisting of a Pack_Start_Code, PCR (Program Clock Reference) and MUX_Rate, and at least one packet which is defined to have the length contained in one sector of the disk. The Pack_Start_Code in the pack header information consists of a 32-bit code, which is defined as "0x000001B4" in hexadecimal notation. Although the length of the pack is variable, it is fixed at 2048 bytes in the video CD.

Figure 2C:
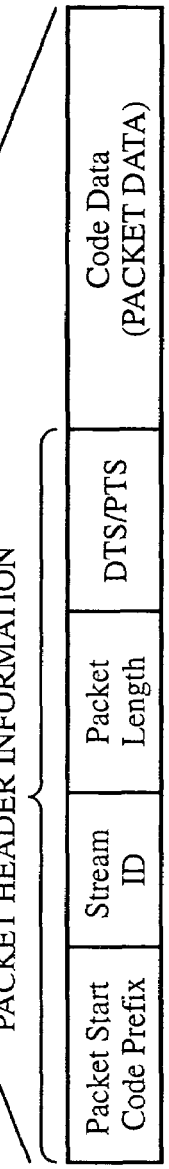

Furthermore, each packet constituting the pack is composed of packet header information and packet data (Code Data) as illustrated in FIG. 2(C). The packet header information consists of a Packet_Start_Code_Prefix, Stream_ID, Packet_Length, PTS (Presentation Time Stamp) and DTS (Decoding Time Stamp). The Packet_Start_Code_Prefix in the packet header information consists of a 24 bit code, which is defined by "0x000001" in hexadecimal notation. The Stream_ID consists of an 8-bit code indicating the type of the packet (Stream Type). The Stream_ID indicates whether the packet data is an Audio Stream and or a Video Stream. The Packet_Length (16 bits) indicates the length of the subsequent packet. The PTS and DTS can be excluded from the packet.

The packet data (Code Data) of each packet records audio data when the packet is used as the Audio_Stream, and picture data when used as the Video_Stream. When a plurality of frame data of the I, P and B pictures are recorded as the packet data (Code Data), a frame start code is added to each recorded frame unit as a start code. In addition, the I pictures are provided with the PTS data without exception.

Next, a disk playback apparatus for playing back a video CD recorded according to the foregoing MPEG standard will be described.

FIG. 1 is a block diagram showing a configuration of an embodiment 1 of the disk playback apparatus in accordance with the present invention. The disk playback apparatus includes a disk drive 11, pickup 12, data processor 13, external memory 14, AV (Audio Video) decoder 15, drive controller 16 and microcomputer for control (called "controlling microcomputer" from on) 17.

The disk drive 11 is loaded with a disk 10 such as a video CD, and carries out the tracking servo and focusing servo in response to a servo signal fed from the drive controller 16 to place the pickup 12 at a designated position.

The pickup 12 reads recorded information from the disk 10. More specifically, the pickup 12 irradiates the signal plane of the disk 10 with a laser beam, converts the light beam reflected back from the signal plane to an electric signal, and outputs it. The signal output from the pickup 12 is supplied to the data processor 13.

Receiving the signal from the pickup 12, the data processor 13 converts it to a digital signal in response to the control signal fed from the control microcomputer 17, and supplies it to the external memory 14 as the playback data.

The external memory 14 sequentially stores the playback data fed from the data processor 13. The external memory 14 corresponds to the memory in accordance with the present invention. The playback data stored in the external memory 14 is read by the AV decoder 15 and control microcomputer 17.

In response to the control signal representing a playback instruction from the control microcomputer 17, the AV decoder 15 reads the playback data from the external memory 14, decodes it and outputs it to the outside as the video signal or audio signal obtained by the decoding.

The drive controller 16 controls the disk drive 11 in response to the control signal fed from the control microcomputer 17. More specifically, in response to the control signal from the control microcomputer 17, the drive controller 16 generates the servo signal for rotating the disk 10 and for placing the pickup 12 onto the designated position, and supplies the servo signal to the disk drive 11.

The control microcomputer 17, which corresponds to the controller in accordance with the present invention, supplies the control signals to the data processor 13, AV decoder 15 and drive controller 16 to control their operation. The control microcomputer 17 includes a continued playback address detecting section 18 and a continued playback address memory section 19, which are implemented by software processing. The continued playback address detecting section 18 and continued playback address memory section 19 correspond to an address detecting section and address memory section in accordance with the present invention, respectively.

The continued playback address detecting section 18 checks the presence or absence of the packet type (Stream Type) data and PTS data constituting the playback data. When it detects that the packet is a Video Stream and the PTS data is present, it supplies the continued playback address memory section 19 with the address on the disk 10 at which the packet is stored. As the address, it is possible to use a physical address which consists of a physical track address and physical sector address of the disk 10, or a logical address which is obtained by converting the physical track address and physical sector address to a continuous sector address.

The continued playback address memory section 19 stores the address from the continued playback address detecting section 18 in place of an address which has already been stored. Accordingly, the continued playback address memory section 19 always stores the address of the packet corresponding to the latest played back picture data on the disk 10.

Next, the operation of the embodiment 1 of the disk playback apparatus in accordance with the present invention with the foregoing configuration will be described with reference to the flowchart of FIG. 3.

First, receiving the instruction to play back the disk 10 inserted into the disk drive 11 from a control panel not shown, the control microcomputer 17 commands the pickup 12 to move (step ST10). Specifically, the control microcomputer 17 generates the control signal to move the pickup 12 to a location (track and sector) from which the playback is to be started, and supplies the control signal to the drive controller 16.

In response to the control signal, the drive controller 16 generates the servo signal and supplies it to the disk drive 11. Thus, the disk drive 11 carries out the tracking servo and focusing servo to move the pickup 12 to the initial position of the designated sector, that is, the initial position of the packet. At the same time, the pickup 12 supplies the signal it reads from the disk 10 to the data processor 13.

Subsequently, according to the timing at which the pickup 12 moves to the target position and the tracking and focusing become stable, the control microcomputer 17 supplies the data processor 13 with the control signal instructing to start the playback (step ST11). In response to the control signal, the data processor 13 converts the signal fed from the pickup 12 to a digital signal, and supplies it to the external memory 14 as the playback data. The external memory 14 sequentially stores the playback data fed from the data processor 13.

Subsequently, the control microcomputer 17 checks whether a predetermined amount of the playback data necessary for the AV decoder 15 to start the decoding is stored in the external memory 14 or not (step ST12). If the control microcomputer 17 decides that the predetermined amount of the playback data has not yet stored in the external memory 14, it waits for the predetermined amount of the playback data to be stored with repeating step ST12.

If the control microcomputer 17 makes a decision that the predetermined amount of the playback data is stored in the external memory 14 during the waiting state with repeating step ST12, the control microcomputer 17 supplies the AV decoder 15 with the control signal representing the playback instruction (step ST13). Thus, the AV decoder 15 starts decoding by reading the playback data from the external memory 14. The decoded signal is output to the outside as the video signal or audio signal.

Subsequently, the continued playback address detecting section 18, which is implemented by the software processing of the control microcomputer 17, acquires the address and packet header information from the external memory 14 (step ST14). Subsequently, the continued playback address detecting section 18 checks whether the packet data of the current playback packet is a Video_Stream (step ST15) by checking the Stream_ID contained in the packet header information acquired in step ST14. If a decision is made that the packet data is not the Video_Stream at step ST15, the sequence is branched to step ST18.

On the other hand, if the continued playback address detecting section 18 makes a decision that the current packet data is the Video_Stream at step ST15, it checks whether the PTS data is present or not (step ST16) by checking the packet header information acquired at step ST14. As for the PTS data, it is always added to the initial packet of I pictures. Accordingly, checking the presence and absence of the PTS data makes it possible to check whether the packet is the initial packet of the I pictures or not.

If the continued playback address detecting section 18 makes a decision that the PTS data is not present at step ST16, the sequence is branched to step ST18. On the other hand, if it decides that the PTS data is present, the continued playback address detecting section 18 stores the address it acquires at step ST14 to the continued playback address memory section 19 as the address for the continued playback (step ST17). The continued playback address detecting section 18, which is composed of the processing of the foregoing steps ST14-ST17, implements the function of storing the address for the continued playback into the continued playback address memory section 19 only when the playback data is the picture data and I pictures, that is, only when the playback data is the initial pictures of the GOPs.

At step ST18, the control microcomputer 17 checks whether a stop instruction is fed from the control panel not shown. If the control microcomputer 17 makes a decision that the stop instruction is not fed, it carries out the instruction to move the pickup 12 to the next sector (the next packet) (step ST19) Specifically, the control microcomputer 17 generates the control signal for moving the pickup 12 to the next sector, and supplies it to the drive controller 16.

The drive controller 16 generates the servo signal in response to the control signal, and supplies it to the disk drive 11. Thus, the disk drive 11 carries out the tracking servo and focusing servo to move the pickup 12 to the initial position of the next sector, namely, the initial position of the next packet, thereby performing the continuous playback. Afterward, the sequence is branched to step ST11 to repeat the foregoing processing.

At the foregoing step ST18, if the control microcomputer 17 makes a decision that the stop instruction is fed, it checks whether the continued playback instruction is fed from the control panel or not (step ST20). If it decides that the continued playback instruction is not fed, the control microcomputer 17 executes step ST20 repeatedly to wait for the continued playback instruction.

If it decides that the continued playback instruction is fed during the waiting state at step ST20, the control microcomputer 17 reads the continued playback address from the continued playback address memory section 19, and carries out the instruction to move the pickup 12 to the sector designated by the address read (step ST21). Specifically, the control microcomputer 17 generates the control signal for moving the pickup 12 to the sector designated by the continued playback address, and supplies it to the drive controller 16.

The drive controller 16 generates the servo signal in response to the control signal, and supplies it to the disk drive 11. Thus, the disk drive 11 carries out the tracking servo and focusing servo to move the pickup 12 to the initial position of the sector designated by the continued playback address, namely, the initial position of the packet designated by the continued playback address, thereby starting the continued playback. Afterward, the sequence is branched to step ST11 to repeat the foregoing processing.

As described above, according to the embodiment 1 of the disk playback apparatus, the continued playback address detecting section 18 stores the address for the continued playback into the continued playback address memory section 19 only when the playback data is the picture data and I pictures, that is, only when the playback data is the initial pictures of the GOPs. Accordingly, when the playback of the disk playback apparatus is stopped, the continued playback address memory section 19 stores the address of the packet corresponding to the latest played back picture data on the disk 10.

When the continued playback instruction is fed during the stop, the playback is started from the address stored in the continued playback address memory section 19 without fail. Thus, the playback is always started from the picture data. Consequently, even if the CD to be played back is a slide show CD, the present embodiment can prevent the audio from being played back first, followed by the playback of the video. Thus, it can start the continued playback without a sense of incongruity.

What is claimed is:

1. A disk playback apparatus including a pickup for reading data recorded on a disk, a memory for storing playback data generated in response to a signal obtained from the pickup, and an AV decoder for generating a video signal and an audio signal in response to the playback data stored in the memory, said disk playback apparatus comprising:

an address detecting section for detecting, when the playback data stored in said memory is picture data, an address at which the picture data is recorded on the disk;

an address memory section for storing, every time said address detecting section detects the address, the detected address in place of an address which has been stored already so that said address memory section always stores the address corresponding to the latest played back picture data on the disk; and a controller for restarting reading, with the pickup, the data recorded on the disk from the address stored in said address memory section in response to a playback instruction issued after a stop, wherein the address detecting section detects the address of the playback data only when the playback data contains picture data.

2. The disk playback apparatus according to claim 1, wherein when the playback data stored in the memory is the picture data, and when header information of the picture data includes information indicating that the picture data is initial picture data of a processing unit consisting of at least one frame, said address detecting section detects the address at which said picture data is recorded on the disk.

3. The disk playback apparatus according to claim 2, wherein the disk records data compressed in accordance with the MPEG standard, and the information indicating the initial picture data in the processing unit is Presentation Time Stamp (PTS) data added to an I picture generated every time the picture data is encoded within a frame.

4. The disk playback apparatus according to claim 2, wherein the address detecting section detects, when the playback data stored in said memory is I picture data, the address at which the I picture data is recorded on the disk.

5. The disk playback apparatus according to claim 1, wherein the address memory section stores the address of the most recent playback data only if the playback data contains picture data.

* * * * *